United States Patent [19]

Byers et al.

[11] E - Re. 28,900

[45] Reissued July 13, 1976

[54] DRILL BIT DEVICE

[76] Inventors: John E. Byers, 2130 Choteau St., Helena, Mont. 59601; Wells H. Claussen, 4523 S.W. Seattle St., Seattle, Wash. 98116

[22] Filed: Aug. 26, 1974

[21] Appl. No.: 500,341

Related U.S. Patent Documents

Reissue of:

[64] Patent No.: 3,687,565
Issued: Aug. 29, 1972
Appl. No.: 119,525
Filed: Mar. 1, 1971

[52] U.S. Cl. ..... 408/201; 145/116 R; 408/214

[51] Int. Cl.[2] ..... B23B 51/00; B23B 51/02

[58] Field of Search ..... 408/201, 208, 214, 230, 408/233, 713; 145/116 R, 116 A, 130

[56] References Cited

UNITED STATES PATENTS

| | | | |
|---|---|---|---|
| 598,142 | 2/1898 | Ferguson | 145/116 R |
| 3,180,379 | 4/1965 | Stewart | 145/116 R |

*Primary Examiner*—Willie G. Abercrombie
*Assistant Examiner*—Z. R. Bilinsky
*Attorney, Agent, or Firm*—Cole & Jensen

[57] ABSTRACT

Drill bit construction having a removable lead screw and a body which has a conically shaped work facing surface. With generally triangularly shaped cut-away segments. Each of the segments has a cutting edge either in the form of a detachable blade or integrally formed into the body. The body itself is also detachably removable from the drill shaft or shank. In smaller diameter embodiments a spiral member recedes from the shaft adjacent the head for removing shaving as the bit proceeds through the wood.

19 Claims, 11 Drawing Figures

INVENTORS
JOHN E. BYERS
WELLS H. CLAUSSEN
BY Graybeal, Cole & Barnard
ATTORNEYS

INVENTORS
JOHN E. BYERS
WELLS H. CLAUSSEN
BY Graybeal, Cole & Barnard
ATTORNEYS

DRILL BIT DEVICE

Matter enclosed in heavy brackets [ ] appears in the original patent but forms no part of this reissue specification; matter printed in italics indicates the additions made by reissue.

BACKGROUND OF THE INVENTION

The invention relates in general to boring tools and more specifically to drill bits having particular application for plumbing and electrical installations as well as other more general drilling uses.

As those in the construction industry and building trades are well aware, a considerable amount of rough boring of framing, roofs, floors and ceilings is required to permit installation of plumbing pipes and electrical wiring conduits. However, heretofore known drilling bits have been designed to withstand the severe conditions under which such rough boring is effected. It frequently happens that a boring tool will strike a nail and become nicked and therefore have to be replaced unless it can be reground. Conventional drill bits, if replaced, are expensive and, of course, regrinding is also an expensive operation. Most of the presently known bits are not made substantially or ruggedly enough to remain sharp, but in fact must be sharpened or reground frequently. Additionally, known bits are prone to clog and therefore jam the drill. When shavings do not come out properly, the drill must be stopped and withdrawn, at times with considerable effort, and the hole cleaned so that the drilling operation can be resumed. Another problem is that a conventional bit will not take hold, as for instance when it must cut a hole drilled between two separate pieces of lumber, since the pieces will be inclined to separate. Additionally, conventional drill bits will catch or hang up if they emerge in such a way that part of the hole is finished and part is not. In other words, if the drill is through drilling on one side and not the other, the tendency in conventional bits is to jam. Because conventional Bits are constructed with a so-called flat or radially extending face, it is difficult to enter the wood at an angle, since the outer edges of the bit engage the wood before the lead screw. Furthermore, there is a tendency to misalign if the lead screw is not taking hold. So far as commercial drilling for plumbing and electrical installations is concerned, the tendency of bits to jam due to clogging or hanging up on nails is dangerous, since the drills themselves are large and can cause injury to the operator if stopped suddenly.

Prior art which the Examiner may wish to consider in this application will be found in U.S. Pat. Nos. 2,681,673; 2,752,965; 2,812,791; and 3,165,131. None of the cited patents is pertinent to the structure of applicants' invention.

SUMMARY OF INVENTION

The drill bit body is formed with its work engaging face shaped generally as a cone. In the larger diameter embodiments the body will have a backwardly extending, cylindrical skirt portion. Replaceable blades are provided in the larger diameters, the cutting edges of which are generally diametrically opposed. The cone working face surface and skirt portions are cut away behind the cutting blades to permit evacuation of shavings. The bits are provided with a replaceable lead screw and also the bit body itself is detachable from the drill shaft, shank or extension. A different manner of keying the body to the shaft is provided in one embodiment of the smaller diameter bit bodies as opposed to the manner in which the larger bit bodies are detachably secured to the shaft. In the smaller diameters the bit shaft is provided with a spiral structure to evacuate shavings from the cutting areas.

Accordingly, it is among the many features, advantages and objects of this invention to provide a drill bit device which has a body detachable from the drill shaft or extension, which has detachable and replaceable blades, which has detachable and replaceable lead screws and which has a body configuration utilizing a generally cone shaped working face surface in which the cutting edges are integral to the body or replaceable. The drill bit of this invention can be operated at higher rotating speeds than is possible with conventional drill bits. The device is not as prone to misalignment and the design configuration is particularly suitable to avoiding jams resulting from clogging or from nails. The design lends itself to drilling various size holes and also permits entry into the wood at different angles without the wood having to be entered at approximately a right angle. Because of the replaceability of the various portions of the body, there is less expense involved as opposed to a conventional drill bit which would have to be replaced entirely if damaged or badly scored.

DESCRIPTION OF PREFERRED EMBODIMENTS

Figure 1:
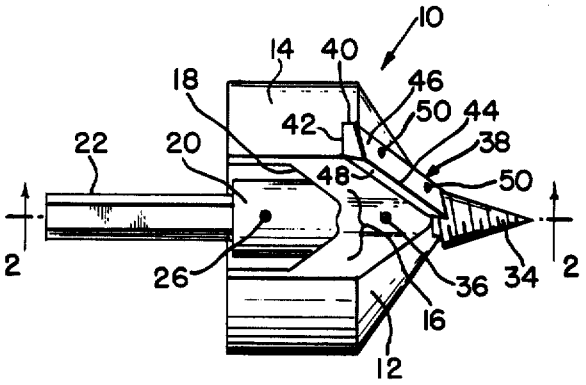
FIG. 1 is a side elevational view of the larger diameter embodiment showing details of construction and configuration.
Figure 2:
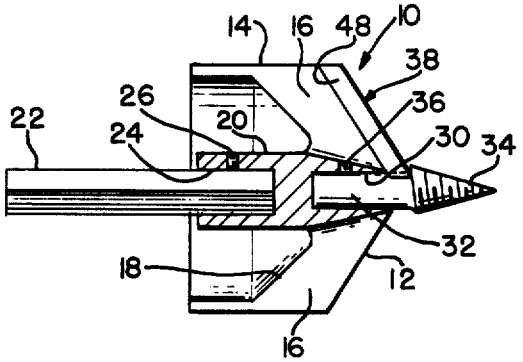
FIG. 2 is a cross-section view taken along the line 2—2 of FIG. 1 and further illustrating details thereof.
Figure 3:
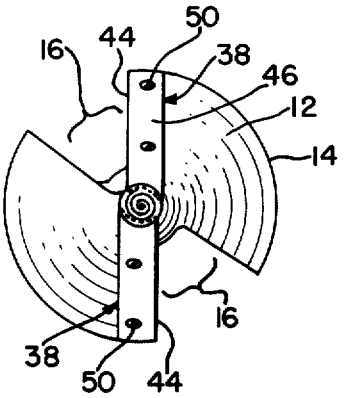
FIG. 3 is a face view of the bit shown in FIGS. 1 and 2.

Referring now to FIGS. 1 through 3 it will be seen that the drill bit body, generally referred to by the number 10, has generally cone shaped face 12 and generally cylindrically and rearwardly extending skirt surface 14. The cone surface shown is approximately at a 30° angle to the longitudinal axis but could vary considerably. Body 10 is also provided with opposed cut-away segments 16 to permit evacuation of shavings from the cutting edges. It can be seen that the body between outer cone surface 12 and its inner surface 18 is fairly substantial in terms of thickness. The inner surface 18 merges with a central section 20 in which shaft 22 and the lead screw are mounted. The central portion is provided with a hexagonal cavity 24 of desired depth to receive the hexagonal shaft 22. A set screw 26 can be tightly threaded against shaft 22 to hold the body and the shaft firmly together. The hexagonal shape of cavity 24 and shaft 22 otherwise prevent any relative rotation between body 10 and shaft 22. On the front end of the body is located cavity 30 to receive shank 32 of lead screw 34. Again, a set screw 36 secures lead screw 34 to the body. Blades 38 are received in offset spaces defined by offset surfaces 40 and 42 in the body. The blades have cutting edge 44 from which the outer surface 46 angles rearwardly and away from cutting edge 44 to merge with face 12. Similarly an inner surface 48 angles slightly to merge with the surface of segment cut-away 16. Blades 38 are held in position by set screws 50. It will be noted in FIG. 3 that the inner ends of blades 38 are arcuately formed to abut the shank 32 of the lead screw 34.

Figure 4:
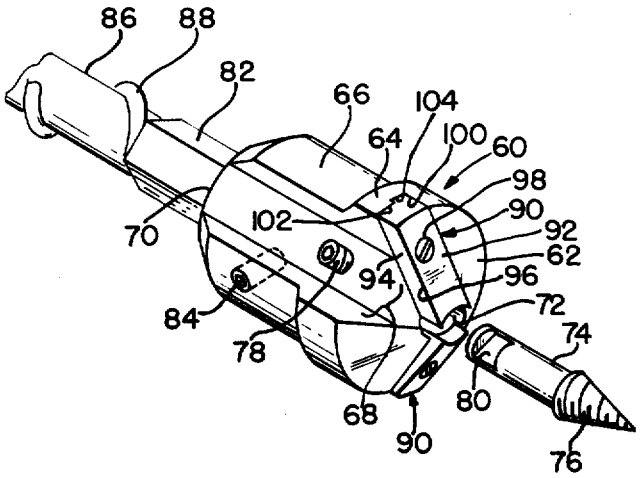
FIG. 4 is a perspective view of the drill bit showing an alternative body design, but retaining the external configuration and form of the body shown in FIGS. 1 through 3.
Figure 5:
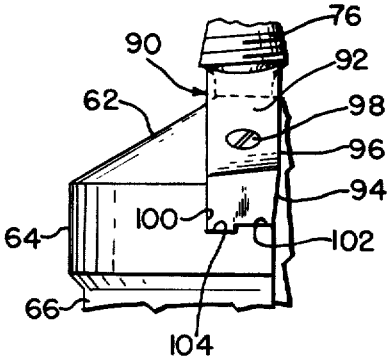
FIG. 5 is a partial side elevation view showing details of the mounting of the replaceable blades in the embodiment of FIG. 4.

FIGS. 4 and 5 show the bit configuration of FIGS. 1 through 3 slightly modified. The body, generally designated by the number 60, has cone working face surface 62, rearwardly extending, cylindrical surface 64 and a rear body section 66 of a diameter reduced from that of surface 64. The body contains cutout segments 68 extending from the cone surface 62 to the rear end 70 of the body. A cavity 72 at the front of the body and centrally located receives the shank 74 of lead screw 76. A set screw 78 in the body engages shank 74 on flat surface 80 to hold the same securely in position. In like manner the hexagonal drill or extension shaft 82 is received in a hexagonal cavity at the rear of body 60 and is held from slipping off by set screw 84. Shaft 82 may in part be round as at 86 which is provided with spiral means 88 for assisting in removing shavings and severed material from the cutting face. Since this particular embodiment is more suited to smaller diameters than the embodiment of FIGS. 1 through 3, it is possible that there will not be space enough for more than one screw to hold the replaceable blades 90 on the body. Blades 90 have outer surface 92 and inner surface 94, which together define the cutting edge 96. Positioning of the blade can be further secured by longitudinal offset surface 100, offset surface 102 and a groove surface 104. Thus, a tongue and groove fit assists in holding blades 90 against undesired movement during drilling operations.

Figure 6:
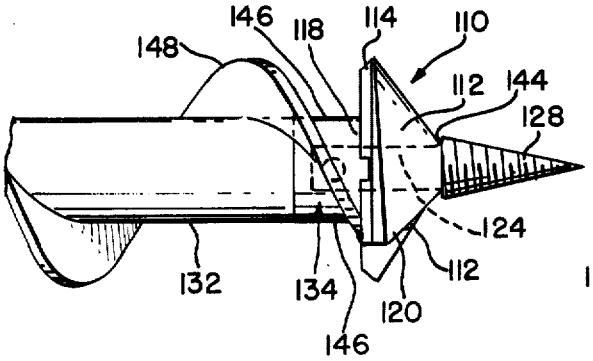
FIG. 6 is an alternative embodiment of the body used for the drilling of smaller diameter holes and illustrating details of the construction thereof.
Figure 7:
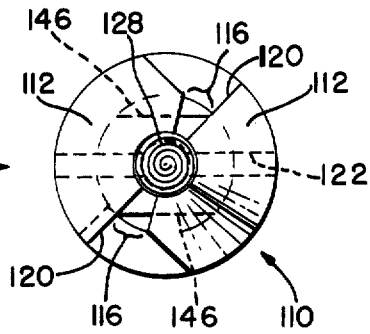
FIG. 7 is a face view of the embodiment of FIG. 6.
Figure 8:
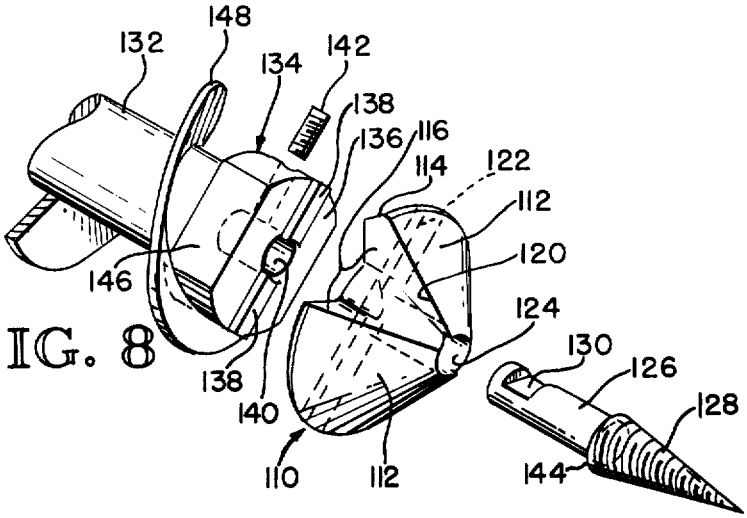
FIG. 8 is an exploded view of the parts of the drill bit embodiment shown in FIGS. 6 and 7.

The embodiment of FIGS. 6 through 8 is another modification of the invention. Bit body 110 has a substantially cone-shaped working face surface 112. A rearwardly and inwardly extending surface 114 is provided and the back side 118 is generally flat. It will be noted that cone surface 112 angles slightly backwardly from each cutting edge 110. Cutout segments 116 are formed in the body for evacuation of shavings. Approximately diametrically disposed across back surface 118 is rectangular keying groove 122. Body 119 is also provided with central cavity 124 to receive shank 126 of lead screw 128. A flat 130 on the shank 126 receives a set screw to secure the bit assembly together.

Drill or extension shaft 132 has a mounting base for body 110 which is generally designated by the number

134. The mounting base 134 has flat mounting surface 136 with upstanding key or tongue 138 to be received in groove 122 of body 110. Cavity 140 receives the shank 126 of lead screw 128 and is held by set screw 142 engaging flat 130 thereof. Thus, body 110 is held on the base by the outer forwardmost edges of cone surfaces 112 engaging an offset abutment surface 144 of the lead screw. Base 134 is provided on opposed sides with flat surfaces 146 which are positioned rearwardly of and coincident with cutout segments 116. A rectangular spiral member 148 extends generally from the plane of front surface 136 on base 134 around said base and onto shaft 132. Spiral member 148 has its end placed so that it does not interfere with the removal of shavings through the segments and across the flat surfaces 146. Thus, shavings are permitted to move rearwardly away from the head past the base 134 and on out the hole being drilled.

Figure 9:
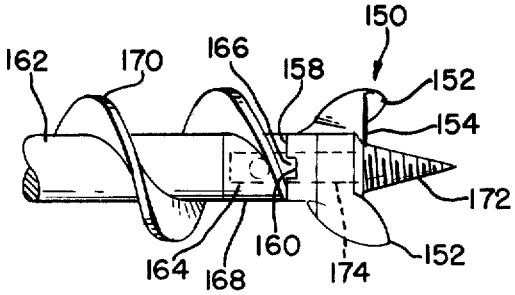
FIG. 9 is another embodiment of the invention showing a different bit body design but retaining the detachable lead screw, keying feature for the body to the shaft, and the spiral shavings evacuator.
Figure 10:
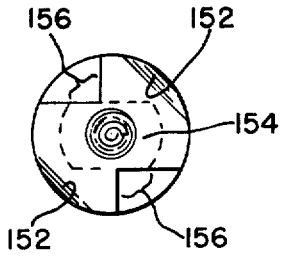
FIG. 10 is a face view of the embodiment of FIG. 9.
Figure 11:
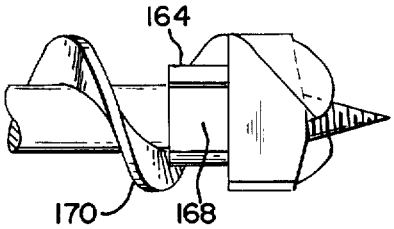
FIG. 11 is the embodiment shown in FIGS. 9 and 10 rotated approximately 90° to further illustrate details thereof.

FIGS. 9–11 show essentially the same small diameter bit of FIGS. 6 through 8 with the exception of the drill bit body. Body 150 has cutters 152, generally flat workface 154, cut-away segments 156, rear surface 158 which is provided with key or locking groove 160. Shaft 162 has mounting base 164 with tongue or key 166 to be received in groove 160. Base 164 has flat surfaces 168 and spiral member 170. Lead screw 172 is provided with shank 174 which extends through body 150 and into the mounting base 164 where a set screw locks the lead screw, body and shaft together. Thus, in all cases a drill bit body containing the cuttings edges or the cutting blades themselves can be replaced at relatively little expense.

We claim:

1. A boring [took] *tool* comprising a. a generally circular drill bit body having a work face and a back end, said work face defining a substantially cone-shaped surface extending rearwardly and outwardly at an angle of about 30°, said body also having a lead screw cavity in said work face generally centrally thereof and a pair of generally opposed cut-away segments extending from said work face to the back end of said body, b. a detachable lead screw including a shank portion received in said lead screw cavity, c. said body also having a center section extending rearwardly and including a shaft cavity for mounting said body on a shaft for rotation by drill means, d. a cutting edge means in each of said segments, and e. means in the center section of said body for detachably securing said lead screw to said body and said body to said shaft.

2. The boring tool according to claim 1 and wherein said body is provided with a cylindrical, rearwardly extending guide surface adjacent the outer edge of said cone surface which is of greater diameter than said center section.

3. The boring tool according to claim 2 and wherein said guide surface is defined by a skirt which is radially spaced from said center section.

4. The boring tool according to claim 1 and wherein said cutting edges are formed on detachable blade means which extend generally from said lead screw generally to the outer edge of said cone surface.

5. The boring tool according to claim 4 and wherein said detachable blade means has an outer planar surface angling slightly away from and rearwardly of said cutting edge.

6. The boring tool according to claim 2 and wherein said center section is radially inwardly offset of said cylindrical surface and extends rearwardly thereof.

7. A boring tool, comprising a. a generally circular drill bit body having a work face and a back end, said body also having a lead screw cavity in said work face and extending through said body generally centrally thereof, and a pair of opposed cut-away segments extending from said work face to the back end of said body, said segments also having cutting edge means therein, b. a detachable lead screw including a shank portion received in said cavity and extending rearwardly of the back end of said body, c. shaft means on which said body is mounted including a mounting base having a shank cavity to receive said shank, d. means in said base securing the shank in said shank cavity and holding said lead screw and body on said mounting base, and e. means for securing said base, lead screw and body against rotation relative to each other.

8. The boring tool of claim 7 and wherein said securing means is on either the base or body and includes coacting securing means on the other of either the base or body.

9. The boring tool of claim 7 and wherein a spiral member extends from the base adjacent the back end of said body to evacuate shavings from said segment areas.

10. The boring tool of claim 9 and wherein said base has flat surfaces generally rearwardly of said segment areas.

11. A boring tool, comprising a. a generally circular drill bit body having a work face and a back end, said work face defining a substantially cone-shaped surface extending rearwardly and outwardly at an angle of about 30°, said body also having a lead screw cavity in said work face and extending through said body generally centrally thereof, and a pair of opposed cut-away segments extending from said work face to the back end of said body, said segments also having cutting edge means therein, b. a detachable lead screw including a shank portion received in said cavity and extending rearwardly of the back end of said body, c. shaft means on which said body is mounted including a mounting base having a shank cavity to receive said shank, d. means in said base securing the shank in said shank cavity and holding said lead screw and body on said mounting base, and e. means for securing said base, lead screw and body against rotation relative to each other.

12. The boring tool of claim 11 and wherein said securing means is on either the base or body and includes coacting securing means on the other of either the base or body.

13. The boring tool of claim 11 and wherein a spiral member extends from the base adjacent the back end of said body to evacuate shaving from said segment areas.

14. The boring tool of claim 13 and wherein said base has flat surfaces generally rearwardly of said segment areas.

*15. A boring tool, comprising:*

*a. generally circularly defined drill bit body having a work face and a rear face, said body also having a lead screw cavity in said work face and extending through said body generally centrally thereof, and a pair of opposed cut-away segments extending from said work face to the rear face of said body, said segments also having cutting edge means therein on the work face thereof,*

*b. a detachable lead screw including a shank portion received in said cavity and extending rearwardly of the rear face of said body,*

*c. shaft means on which said body is mounted including a mounting base having a shank cavity to receive said shank,*

*d. first means in said base securing the shank in said shank cavity and holding said lead screw and body on said mounting base, and*

*e. second means for securing said base and body against rotation relative to each other.*

*16. The boring tool of claim 15 and wherein said base is formed to provide unobstructed areas generally rearwardly of said segment areas to evacuate shavings from said segment areas.*

*17. The boring tool of claim 15 and wherein a spiral member extends generally rearwardly from the base to evacuate shavings from said segment areas.*

*18. A boring tool, comprising:*

*a. a generally circular drill bit body having a work face and a back end, said work face defining a substantially cone-shaped surface extending rearwardly and outwardly at an angle of about 30°, said body also having a lead screw cavity in said work face generally centrally thereof, and a pair of opposed cut-away segments extending from said work face to the back end of said body, said segments also having cutting edge means therein,*

*b. a detachable lead screw including a shank portion received in said lead screw cavity,*

*c. shaft means including a mounting portion to which said body is secured for nonrotational movement relative thereto, and,*

*d. means securing said shank in said lead screw cavity for securely holding said lead screw and body together and against rotation relative to each other.*

*19. The boring tool of claim 18 and wherein a spiral member extends generally rearwardly from a point adjacent the back end of said body to evacuate shavings from said segment areas.*

* * * * *